March 10, 1936.  I. J. MITCHELL  2,033,846
PIVOT SAW
Filed July 26, 1934   4 Sheets-Sheet 1
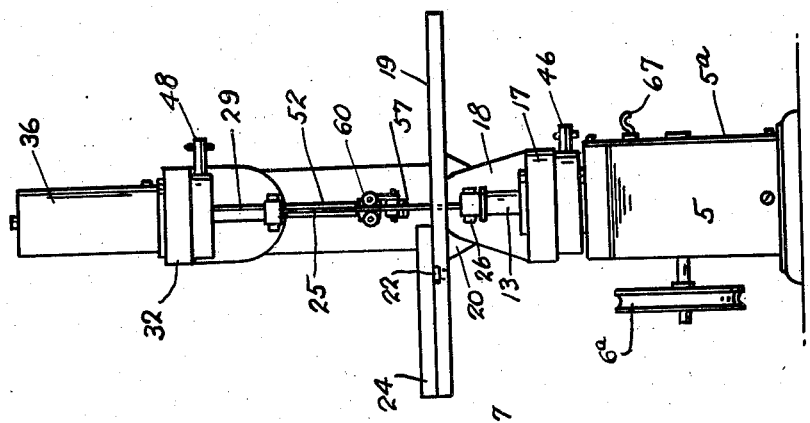
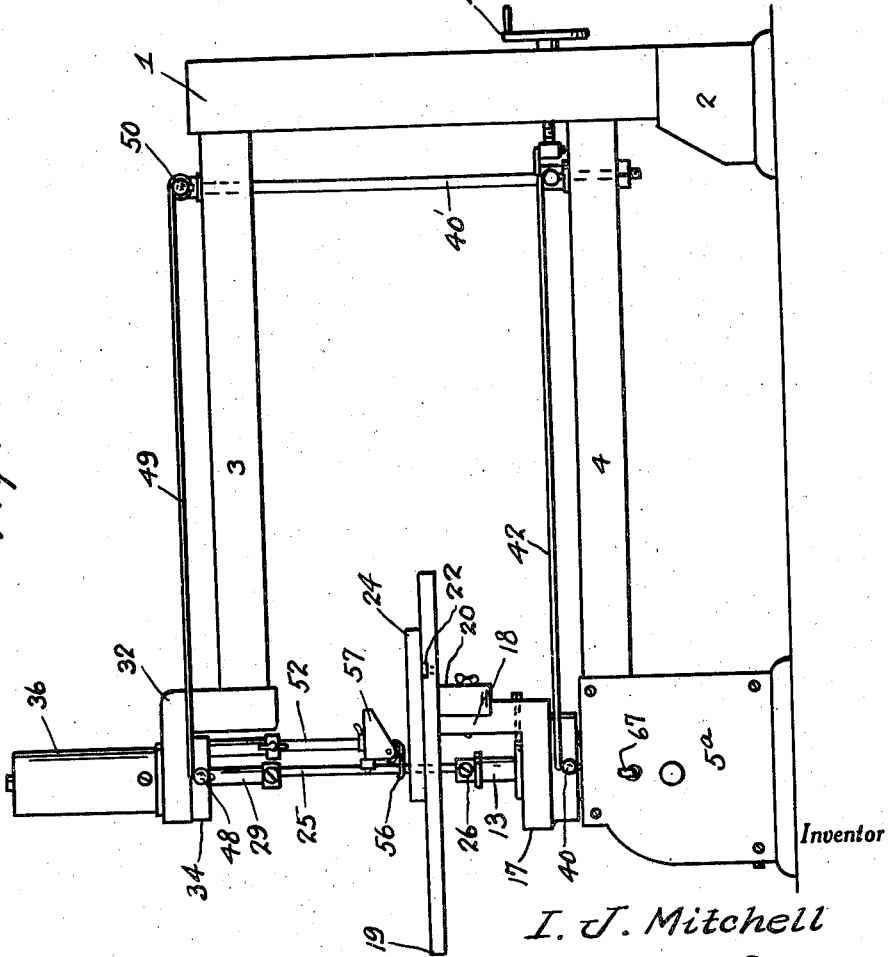
Inventor
I. J. Mitchell
By Clarence A. O'Brien
Attorney March 10, 1936.    I. J. MITCHELL    2,033,846
PIVOT SAW
Filed July 26, 1934    4 Sheets-Sheet 2

Inventor
I. J. Mitchell

By Clarence A. O'Brien
Attorney

March 10, 1936.  I. J. MITCHELL  2,033,846
PIVOT SAW
Filed July 26, 1934  4 Sheets-Sheet 3

Inventor

I. J. Mitchell

By Clarence A. O'Brien
Attorney

March 10, 1936. I. J. MITCHELL 2,033,846
PIVOT SAW
Filed July 26, 1934 4 Sheets-Sheet 4
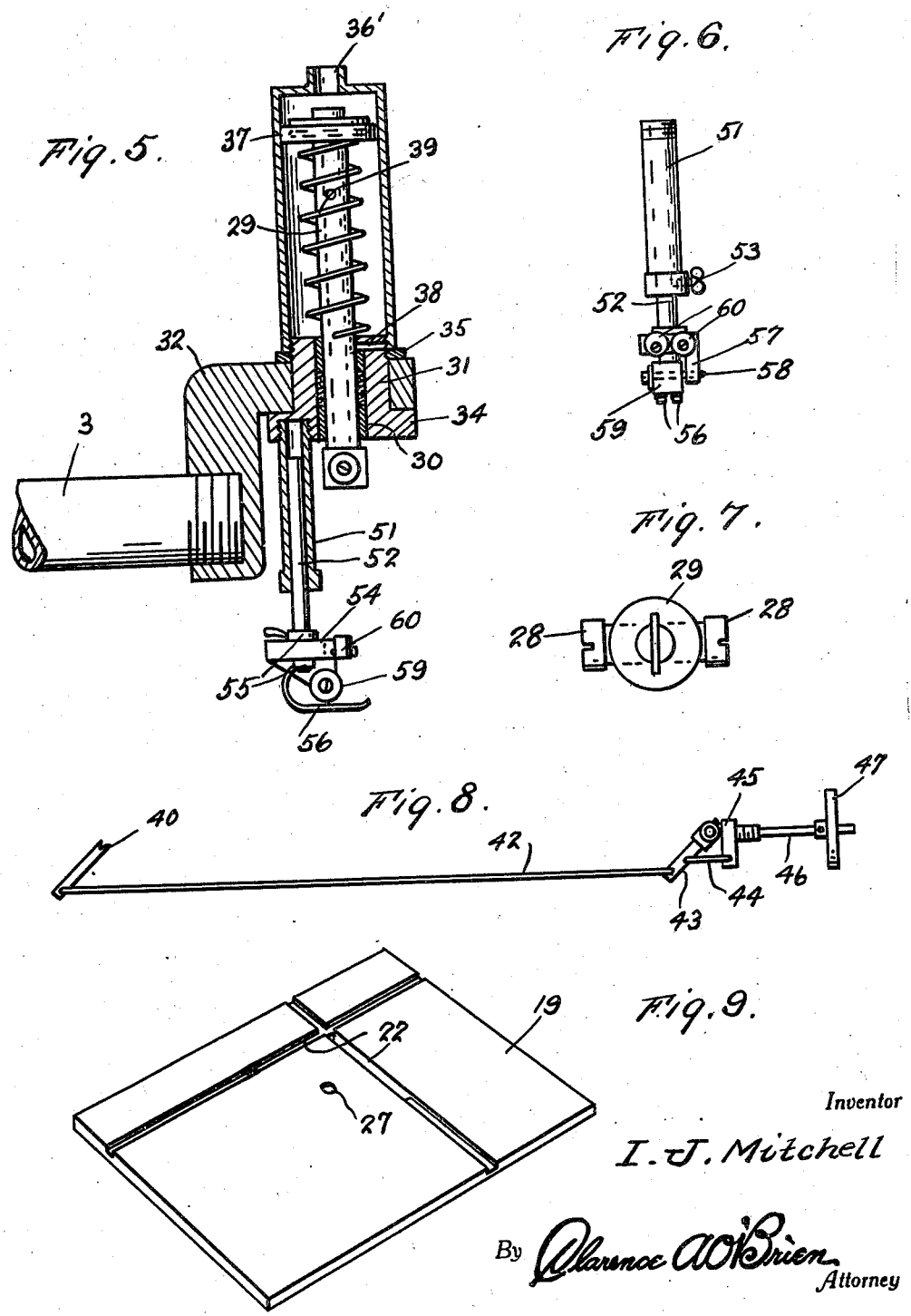
Inventor
I. J. Mitchell
By Clarence A. O'Brien
Attorney Patented Mar. 10, 1936

2,033,846

UNITED STATES PATENT OFFICE 2,033,846

PIVOT SAW

Ivan Joel Mitchell, Orlando, Fla.

Application July 26, 1934, Serial No. 737,115

7 Claims. (Cl. 143—70)

This invention has reference to certain improvements in a motor driven saw in which the blade of the saw is held between two reciprocating guides.

Among the objects of the invention are to provide a saw wherein the vertically reciprocating guides can be rotated, either while in action or at rest, by a single control, such as a lever or the like, still another object is to provide in a saw of this character a table which will tilt at an angle to its normal position and which is so engaged as to turn in unison with the guides in response to the shifting control.

A still further object of the invention is to provide a telescopic hold down contrivance that overcomes the tendency of the material being sawed to jump upward on the upward stroke of the blade, together with an adjustable roller guide to reinforce the blade at this section; the hold down turning in unison with the table, guides and blade.

A further object of the invention is in the provision of a blade reinforcing and guiding means which will also serve to preserve alinement to such an extent that a saw guide can be used.

A further object of the invention is to provide a pivot saw which will serve efficiently for cutting irregular lines, during scroll and fret work and all other conventional work of an ordinary jig-saw.

Still a further object of the invention is to provide in a saw of this character a source of air to be utilized for blowing the scraps or dust from the machine and the work.

Other objects and advantages of the invention will be apparent from a study of the following description taken in connection with the accompanying drawings wherein:

Figure 1 is a side elevational view of the machine.

Figure 2 is an end elevational view.

Figure 5 is an enlarged sectional view through the upper guide and associated parts.

Figure 6 is an elevational view of the hold down device.

Figure 7 is a bottom plan view of the upper saw guide.

Figure 8 is a somewhat diagrammatic view of the control.

Figure 9 is a perspective view of the table and

Figure 3:
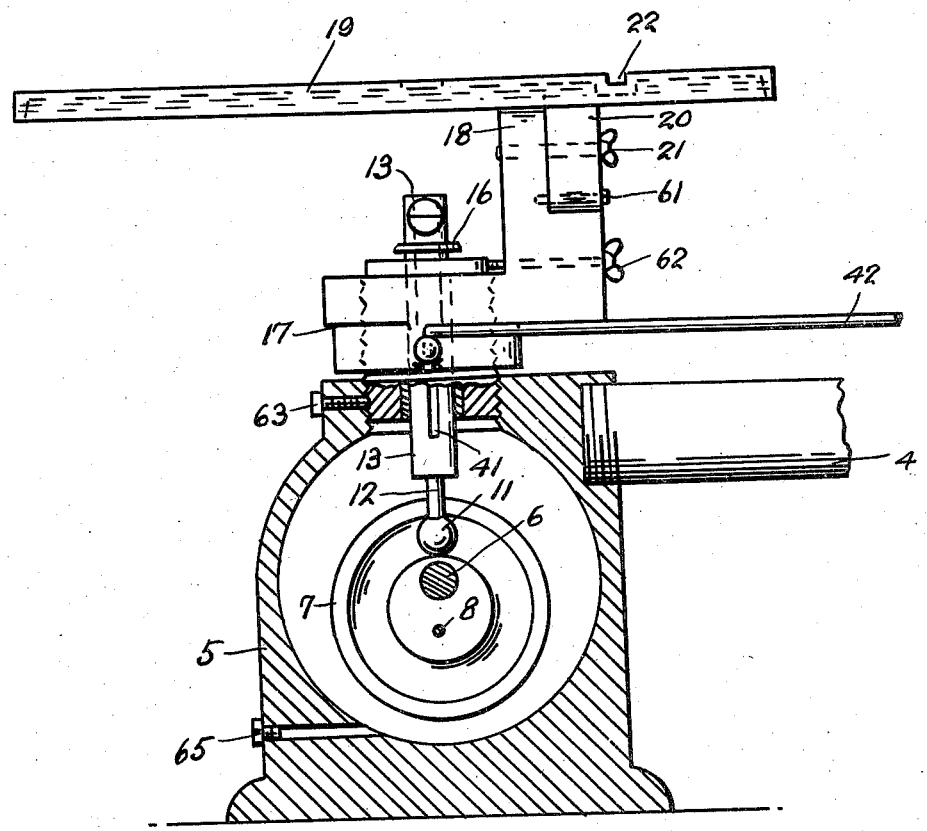
Figure 3 is an enlarged elevational view of a portion of the machine certain parts being shown in section.
Figure 10:
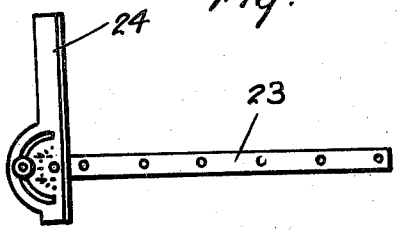
Figure 10 is a plan view of a ripping guide.

Referring to the drawings by reference numerals it will be seen that the device comprises a post 1 rising from a base 2, and extending laterally from one side of the post are vertically spaced horizontal arms 3, 4.

Figure 4:
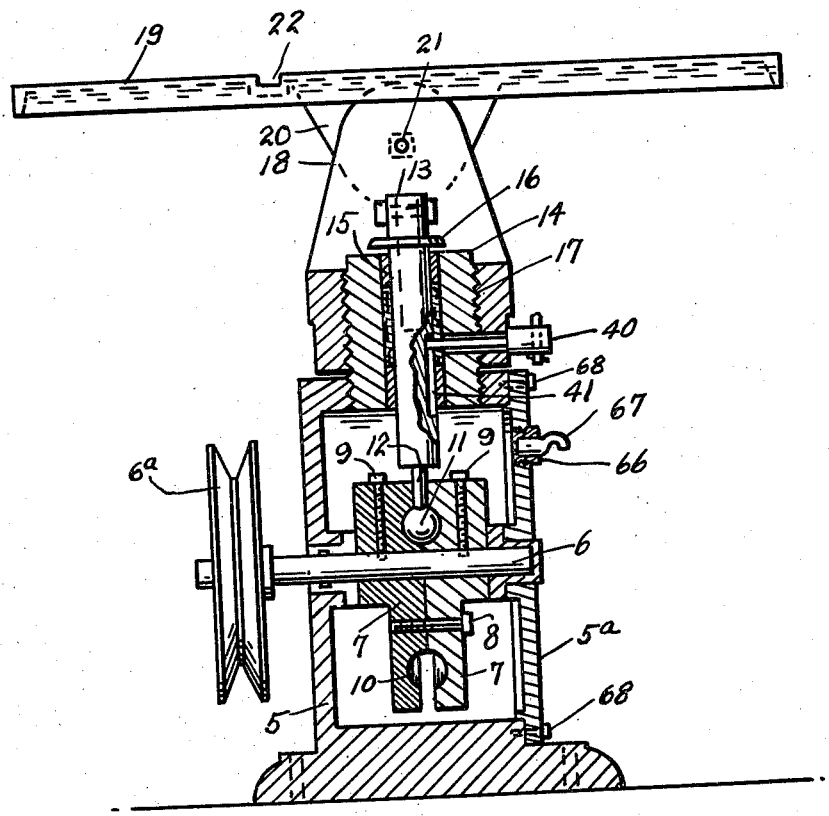
Figure 4 is a view taken at substantially right angles to Figure 3.

The arm 4 connects the post 1 with a casing 5 in which is journalled a shaft 6. Eccentrically secured to the shaft 6 for rotation therewith is a cam disk which latter is divided into two complemental sections 7 secured together by a screw 8, and secured to the shaft 6 by screws 9. The meeting faces of the parts of the cam disk are suitably formed to provide a cam groove 10, and a slot as clearly shown in Figure 4 to accommodate a ball member 11 and a stem 12 which connects the ball member with a cylindrical saw guide 13. It will thus be seen that upon rotation of the shaft 6, which latter is provided at one end with a power wheel 6a, reciprocatory motion will be imparted to the guide 13.

The guide 13 operates through a tubular guide casing 14 that is screwed into a suitable opening provided in the top of the casing 5. Also, the guide works through suitable bushing means 15. Adjacent its upper end the guide is also provided with a shield 16 to prevent the dust and cuttings from effectively interfering with a smooth operation of the guide 13.

Threaded on the guide case 14 is a collar 17 that has rising therefrom a lug 18.

A work supporting table 19 is provided with a depending lug or flange 20 whereby the table is secured to the lug 18 of the collar 17 for movement with the collar or for pivotal movement in a vertical direction relative to the collar by a suitable pivot screw 21.

As shown in Figure 9 the table 19 in its top is provided with suitably arranged intersecting grooves 22 for accommodating the tongue 23 of a ripping guide 24 associated with the tongue 23 in any suitable manner, the guide 24 and its tongue 23 not being of the essence of the present invention.

Above the dust shield 16 the guide 13 is provided with a socket or the like to receive the lower end of the saw or other cutting tool 25. The lower end of the saw 25 is held in engagement with the guide 13 through the medium of suitable set screws 26.

The saw 25 which works through a suitable opening 27 provided therefor in the table 19 has its upper end secured by set screws 28 in the lower end of an upper, vertically reciprocating saw guide 29.

The saw guide 29 is of elongated tubular form and operates through suitable bushing means 30 provided in the bore of a guide casing 31. The guide casing 31 is rotatably mounted in an aperture provided in the horizontal arm of an angular bracket 32 secured to the free end of the frame arm or bar 3 in a manner clearly shown in Figure 5.

The guide case 31 is engaged with the bracket 32 for rotation relative to the bracket through the medium of a collar 34 on the lower end of the guide case and a nut 35 threadedly engaged with the upper end of the guide case 31.

The upper end of the saw guide 29 operates in what may be termed a pump casing or housing 36 that its lower end screwed on to the upper end of the guide case 31 as also shown in Figure 5. The upper end of the case 36 is provided with an exhaust opening 36', and arranged to reciprocate within the casing 36, and connected to the upper end of the guide 29 is a piston 37.

The bushing structure 30 is held against rotation through the medium of a suitable pin 38, and the guide 29 is normally urged upwardly through the medium of a coil spring 39 disposed thereabout and having one end impinging against the upper end of the case 31, and its upper end impinging against the piston 37.

The tube of the guide 29 is hollow to provide an air passage and adjacent its upper end is provided with an air port 39' through which, upon downward movement of the piston 37 air is forced under pressure to pass downwardly through the guide 29, discharging from the guide about the upper end of the saw, for blowing therefrom the dust and other cuttings that might adhere to the saw.

From the above it will be apparent that with the saw blade connected with the guides 13 and 29 in the manner above explained and shaft 6 is in operation reciprocation will be imparted to the saw and its guides and that the spring 39 will assist in the return of the guide 29 thus eliminating a push being exerted thereon by the saw and the lower guide 13, thus providing for more efficient operation of the device. Also the spring 39 exerting an upward pull on the guide 29 will aid in maintaining proper tension on the saw blade 25.

For rotating the guide 13 there is provided a pin 40 that is secured in any suitable manner in the collar 17 and extends through an aperture provided in the guide case 14, and at its inner end the pin 40 works in a groove 41 provided in the guide 13. At its outer or head equipped end the pin 40 is connected through the medium of a link 42 with an arm 43 that is secured to a vertical rod 40' the ends of which are journalled in the frame bars 3 and 4. The arm 43 in turn is connected by a link 44 with a follower block 45 on the threaded end of a stub shaft 46 that is journalled in a suitable opening provided in the post or standard 1, and which is suitably secured against longitudinal movement transversely of the post 1. On its free end the shaft 46 is equipped with a hand wheel 47 so that by turning the wheel in one direction the follower block 45 will be caused to move for example to the right in Figure 8 thus swinging the arm 43 in a counter clockwise direction to rotate the guide 13 in a counter clockwise direction.

For rotating the upper guide 29 in unison with the guide 13 the upper guide housing 31 is provided with an extending pin 48 which is connected by a link 49 with an arm 50 on the upper end of the rod 40'. Thus turning movement of the rod 40' will be transmitted simultaneously to the guides 13 and 29 for rotating them. In this connection it will be noted that the pin 48 operates in a suitable groove provided in the guide 29 so that said guide will be caused to rotate with its housing 31.

In connection with the above it will be noted that the pin 40 also is anchored securely in the collar 17 so that the table 19 associated with the collar hereinbefore set out will be caused to rotate with the guides 13 and 29.

A combination saw reinforcing means and hold down device is also provided and the same comprises a tubular casing 51 that has its upper end threadedly engaged with the bottom of the guide housing 31 as clearly shown in Figure 5. Mounted for vertical adjustment within the housing 51 is a rod 52 that is secured at the desired adjustment through the medium of a set screw 53. Suitably clamped on the lower end of the rod 52 is a block 54, the clamping means for the block being indicated generally by the reference numeral 55. Carried by the underside of the block 54 is a bifurcated hold down spring 56 that is adapted to engage with the work so as to prevent the work from moving upwardly as otherwise it would do upon the upward movement of the saw in the cutting operation.

The block 54 is also provided at one side with a depending flange 57 carrying a shaft 58 supporting an eccentric roller 59 that is adapted to bear against the back edge of the saw. Also carried by the block 54 and on an axis at right angles to the axis 58 of the roller 59 are eccentrically mounted guide rollers 60 between which the saw blade operates. By varying the rotative position of the rollers 60 the pressure thereof against the sides of the blade may be increased or lessened as found desirable.

From the above it will be apparent that in operation the saw will, upon power being transmitted to shaft 6, be reciprocated, the saw operating through the hold down 56 which will exert a pressure on the board or like being cut, the saw being further guided and reinforced through the medium of the rollers 59 and 60 as before explained.

Also on each downward movement of the saw a blast of air will be forced thereagainst, discharging through the lower end of the guide 29, the air being forced through the guide 29 from the pump formed by the casing 36 and the piston 37 operating in said casing.

If desired, and as shown, an additional screw 61 may be employed for securing the table 19 at the desired adjustment; while an additional screw 62 may be employed for securing the parts 17 and 14 against angular and axial movement relative to one another, and a screw 63 employed for more positively securing the casing or housing 14 in threaded engagement with the cam and shaft casing 5.

For lubricating purposes the splash system may be utilized, and to this end there is provided for the casing 5 drain means 65, and a breather 66 equipped with a goose neck 67 as clearly shown. The breather 66 is suitably mounted in the cover plate 5a that is provided for the housing 5 and is secured in position through the medium of suitable fastening means 68.

Shims .001 of an inch can be placed between cams to compensate for long and arduous wear, or for best possible adjustment. The short link 44 can be disengaged at any time so that the operator can change the direction of sawing by using the table as the turning or shifting element, the blade and hold down turning in unison.

The table support can turn in the form of a collar around the casing 14 instead of being threaded on it, as shown in this form of the invention.

What is claimed is:

1. In a saw device of the class described, including an upper saw guide member supported for reciprocatory and rotary movement, said member having an elongated chamber therein opening out through the lower end thereof, a cylinder into which the upper portion of the upper guide member extends, a piston in the cylinder and connected with the upper end of the upper guide member, said guide member having a port therein connecting the chamber with the interior of the cylinder below the piston whereby the air compressed in the cylinder by the downward movement of the piston will enter the chamber and pass from the lower end of the upper guide member.

2. In a saw device of the class described, a supporting structure including a housing, a shaft transversely arranged in the housing and supported for rotary movement, means for rotating the shaft, a circular member located in the housing and connected with the shaft for rotation therewith, said member having an eccentric groove therein and a slot extending from the circumference of the member to the groove, said groove being of circular shape in cross section, a guide member, means at the upper end of the housing for supporting the guide member for reciprocatory and rotary movement, the lower end of the guide member having a reduced part passing through the slot and terminating in a spherical member engaging the eccentric annular groove, an upper guide member, means carried by the supporting structure for supporting the upper guide member for reciprocatory and rotary motion, the two guide members being in vertical alignment, and means for connecting a blade at one end to the upper end of the lower guide member and at its other end to the lower end of the upper guide member.

3. In a saw device of the class described, a supporting structure, a vertically arranged bushing rotatably arranged in the upper part of the structure, an upper guide member passing through the bushing, means for connecting the guide member with the bushing for reciprocatory movement of the guide member while causing the guide member to rotate with the bushing, a lower guide member in vertical alignment with the first-mentioned guide member, means for connecting a blade at one end to the lower end of the upper guide member and at its other end to the upper end of the lower guide member, a vertical supporting member having a bore which slidably receives the lower guide member, means for reciprocating the lower guide member, a bracket having a part rotatably arranged on the vertical supporting member and another part extending upwardly, a table having an opening therein for the passage of the blade, means for connecting the table to the upwardly extending part of the bracket for rocking movement thereon, means for connecting that part of the bracket which is rotatably arranged on the vertical supporting member with the lower guide member for rotary movement therewith while permitting the lower guide member to reciprocate and means connecting the last-mentioned means with the first-mentioned bushing to cause the table supporting bracket, the lower guide member and the upper bushing and upper guide member to rotate in unison.

4. In a saw device of the class described, a supporting structure, a vertically arranged bushing rotatably arranged in the upper part of the structure, an upper guide member passing through the bushing, means for connecting the guide member with the bushing for reciprocatory movement of the guide member while causing the guide member to rotate with the bushing, a lower guide member in vertical alignment with the first-mentioned guide member, means for connecting a blade at one end to the lower end of the upper guide member and at its other end to the upper end of the lower guide member, a housing containing lubricant, an upstanding member connected with the top of the housing and having a bore which slidably receives the lower guide member, a transverse shaft journaled in the housing, means for rotating the shaft, a circular member attached to the shaft and having an annular eccentric groove therein, the lower end of the lower guide member having an enlargement engaging the groove, a bracket having a part rotatably arranged on the upstanding member and another part extending upwardly, a table having an opening therein for the passage of the blade, means for connecting the table to the upwardly extending part of the bracket for rocking movement thereon, means for connecting that part of the bracket which is rotatably arranged on the upstanding member with the lower guide member for rotary movement therewith while permitting the lower guide member to reciprocate and means connecting the last-mentioned means with the first-mentioned bushing to cause the table supporting bracket, the lower guide member and the upper bushing and upper guide member to rotate in unison, said last-mentioned means including a vertically arranged shaft rotatably supported by the structure and having arms extending at right angles therefrom, a link connected to one arm and also connected to the means which connects the bracket with the lower guide member, and a second link connected with the other arm and with the upper bushing.

5. In a saw device of the class described, a supporting structure including a housing, a shaft transversely arranged in the housing, means for rotating the shaft, a circular member located in the housing and connected with the shaft for rotation therewith, said member having an eccentric groove therein of circular shape in cross section and a slot extending from the groove through a portion of the circumference of the member, a saw guide supported for rotary and reciprocatory movement in the structure and having a stem at its lower end terminating in a spherical part and fits in the groove, means for connecting one end of the saw blade to the upper end of the guide, a table supported by the structure and means for connecting the guide with the table whereby rotary movement of the table will be communicated to the guide and vice versa.

6. In a saw device of the class described, a supporting structure including upper and lower spaced parts, a vertically arranged bushing rotatably supported in the upper part, an upper saw guide supported for reciprocatory movement by the bushing and rotating therewith, a presser foot having saw blade engaging means thereon, having its upper end connected with the bushing, a lower saw guide supported for rotary and reciprocatory movement in the lower part of the supporting structure, means for reciprocating one of the guides, a table supported by the lower part of the structure, means for connecting the table with the lower guide, whereby rotary movement of the table will be communicated to said guide and vice versa, and means for communicating such movement of said parts to the upper bushing.

7. In a saw device of the class described, a supporting structure, a bracket having a part rotatably supported by part of the structure, said bracket having an upstanding part, a table connected with the upstanding part for rocking movement about a horizontal axis, blade holding means supported by the structure for reciprocatory motion and said blade holding means being capable of rotary motion, and means for imparting rotary movement of the bracket to the blade holding means and vice versa.

IVAN JOEL MITCHELL.